United States Patent [19]

Roge

[11] 3,781,480

[45] Dec. 25, 1973

[54] LOOP EXTENDER

[75] Inventor: Ralph R. Roge, Du Page County, Ill.

[73] Assignee: Wescom, Inc., Downers Grove, Ill.

[22] Filed: Nov. 10, 1970

[21] Appl. No.: 88,270

[52] U.S. Cl. .......... 179/16 F

[51] Int. Cl. .......... H04q 1/30

[58] Field of Search .......... 179/16 R, 16 A, 16 AA, 179/16 E, 16 EA, 16 F

[56] References Cited

UNITED STATES PATENTS

| | | | |
|---|---|---|---|
| 3,531,598 | 9/1970 | McNair, Jr. | 179/16 F |
| 3,527,894 | 9/1970 | Mesenheimer et al. | 179/16 F |
| 3,514,543 | 5/1970 | Rae | 179/16 F |
| 3,508,009 | 4/1970 | Henry et al. | 179/16 F |
| 3,339,027 | 8/1967 | Feiner et al. | 179/16 F |
| 3,626,201 | 12/1971 | Chambers, Jr. | 179/16 F |
| 3,639,696 | 2/1972 | Chambers, Jr. | 179/16 F |
| 3,621,143 | 11/1971 | Chambers, Jr. | 179/16 F |

*Primary Examiner*—Kathleen H. Claffy
*Assistant Examiner*—Randall P. Myers
*Attorney*—Wolfe, Hubbard, Leydig, Voit & Osann

[57] ABSTRACT

To increase the effective signaling and supervisory range of a central office, a loop extender has tip side and ring side booster circuits, each of which comprise a pair of oppositely polarized floating booster voltage supplies and a loop polarity detector for selectively switching one of such supplies into series with the central office battery. Time constant circuits are associated with each of the loop polarity detectors so that they follow changes in the d. c. polarization of the central office ring and tip leads relative to one another and to ground, but not the a.c. swings of any ringing voltage that may be present. Provision is made, however, for overriding the time constant circuit for the tip side polarity detector in the absence of a ringing voltage so that it can then follow short time constant changes in the d. c. polarization of the tip lead. The booster voltage supplies are secondary supplies which are energized by power from a primary supply only in the presence of a control signal in one or both of the central office tip and ring leads, whereby the power drained by the loop extender is minimized. Further, the maximum current that can be drawn from the primary supply is limited, thereby protecting the loop extender and other central office equipment against being damaged in the event that the output of the loop extender is inadvertently short circuited or coupled to a low impedance subscriber's loop.

10 Claims, 2 Drawing Figures

INVENTOR.
RALPH R. ROGE,
BY
Wolfe, Hubbard, Leydig, Voit & Osann
ATTORNEYS.

INVENTOR.
RALPH R. ROGE,
BY
Wolfe, Hubbard, Leydig, Voit & Osann
ATTORNEYS.

LOOP EXTENDER

BACKGROUND OF THE INVENTION

This invention relates to telephony, and more particularly to loop extenders for increasing the signaling and supervisory range of central office equipment.

Various signaling and supervisory signals are employed in telephony to ensure proper servicing and billing of the subscribers. The characteristics and purposes of such signals, which are sometimes collectively referred to herein for convenience as "control signals", are known. Thus, no attempt will be made to supply an extended listing of them. Rather, it suffices to note that as used herein, "signaling and supervisory signals," or "control signals," means those signals, other than voice and data communication signals, which are transmitted between a central office and the subscribers served thereby and which to be effective must be received with at least certain minimum d.c. voltage levels. Of course, the minimum effective d.c. voltage level varies from one type of control signal to another. For example, the minimum effective level for the ringing voltage which is employed to actuate the ringer circuit of a called party's telephone is substantially higher than the minimum effective level for the pulse which is used in party line applications to automatically identify the calling party.

As will be appreciated, the range of a central office is limited by the distance its necessary control signals can be transmitted without becoming so attenuated that they are no longer useful for their intended purposes. The limiting distance is, in turn, dependent on the d.c. levels at which the control signals are transmitted, together with the impedance and background noise characteristics of the transmission lines that are used. Desirably, of course, the number of central office installations required for a telephone system is minimized, since each central office represents a very substantial capital investment. However, the basic and overriding requirement is that each subscriber to be served must be within the effective range of a central office. Consequently, the aforementioned range limitations are of substantial importance, especially in rurual and other areas of low population density.

In view of the foregoing, various approaches have been suggested for increasing the effective signaling and supervisory range of central offices. For example, proposals have been made to decrease the impedance of the transmission lines, such as by using larger gauge wire. However, those proposals have not, as yet, yielded any economical solutions to the problem. Attention has been turned, therefore, to the use of loop extenders for increasing or "boosting" the d.c. levels at which the signaling and supervisory signals are transmitted over the longer length transmission lines.

The known loop extenders are not fully satisfactory. For example, some of them are continuously on line, even when the subscriber is on-hook and no control signals are being transmitted (i.e., under quiescent or idle circuit conditions). Such loop extenders drain substantially more power than they actually require and they may in certain instances substantially increase the noise level in the subscriber's loop, such as by supplying sufficient quiescent output voltage to maintain the gas tubes used in a four party selective ringer circuit in an active state. As another example, some of the known loop extenders must be carefully matched by output voltage strapping techniques to the impedance of the particular subscriber's loops with which they are to be employed. In those instances there is a danger that the loop extender or other equipment in the central office may be damaged, if the output of the loop extender is accidentally short circuited or even connected to a relatively short or low impedance subscriber's loop.

It is known that loop extenders should follow any changes in the d.c. polarization of the central office battery. This is necessary to ensure that the loop extender boosts, rather than suppresses, even those control signals that are generated by reversing the d.c. polarities of the central office tip and ring leads relative to one another and by polarizing the tip and ring leads identically relative to a reference, say ground. Some problems have heretofore been encountered, however, in providing a loop extender which will reliably discriminate between such changes in d.c. polarization and the a.c. component of a ringing voltage.

SUMMARY OF THE INVENTION

It is a primary object of the present invention to provide an improved loop extender for increasing the signaling and supervisory range of central offices.

More particularly, it is an object of this invention to provide a loop extender which drains no appreciable power from and contributes no appreciable noise to the telephone system under idle circuit conditions. A related object is the provision of a loop extender which automatically reverts to an inactive state in response to an idle circuit condition.

Another object of this invention is to be a loop extender which is satisfactory for use with different length and impedance subscriber's loops without any special strapping of its output voltages. A related object is to provide a current limited loop extender which can be installed with little risk that either it or any other equipment will be damaged, even if the output of the loop extender is inadvertently short circuited or connected to a relatively low impedance subscriber's loop.

Still another object of this invention is to provide a loop extender which reliably follows any changes in the d.c. polarities of the central office tip and ring leads, but not the a.c. component of any ringing voltage. In other words, an object is the provision of a loop extender which remains in aiding relationship with the central office battery, regardless of any changes in its polarization relative to either or both of the tip and ring leads and even in the presence of a ringing voltage with its substantial a.c. voltage component.

Finally, it is an object of this invention to provide a loop extender which is fully compatible with the signaling and supervisory signals currently used in telephony and which incorporates each of the above mentioned advantageous features.

BRIEF DESCRIPTION OF THE DRAWINGS

Other objects and advantages of the present invention will become apparent when the following detailed description is read in conjunction with the attached drawings, in which.

DETAILED DESCRIPTION OF THE ILLUSTRATED EMBODIMENT

While the invention is described in detail hereinafter with reference to a single illustrated embodiment, it is to be understood that the intent is not to limit it to that embodiment. To the contrary, the intent is to cover all modifications, alternatives and equivalents that fall within the spirit and scope of the invention as defined by the appended claims.

Figure 1:
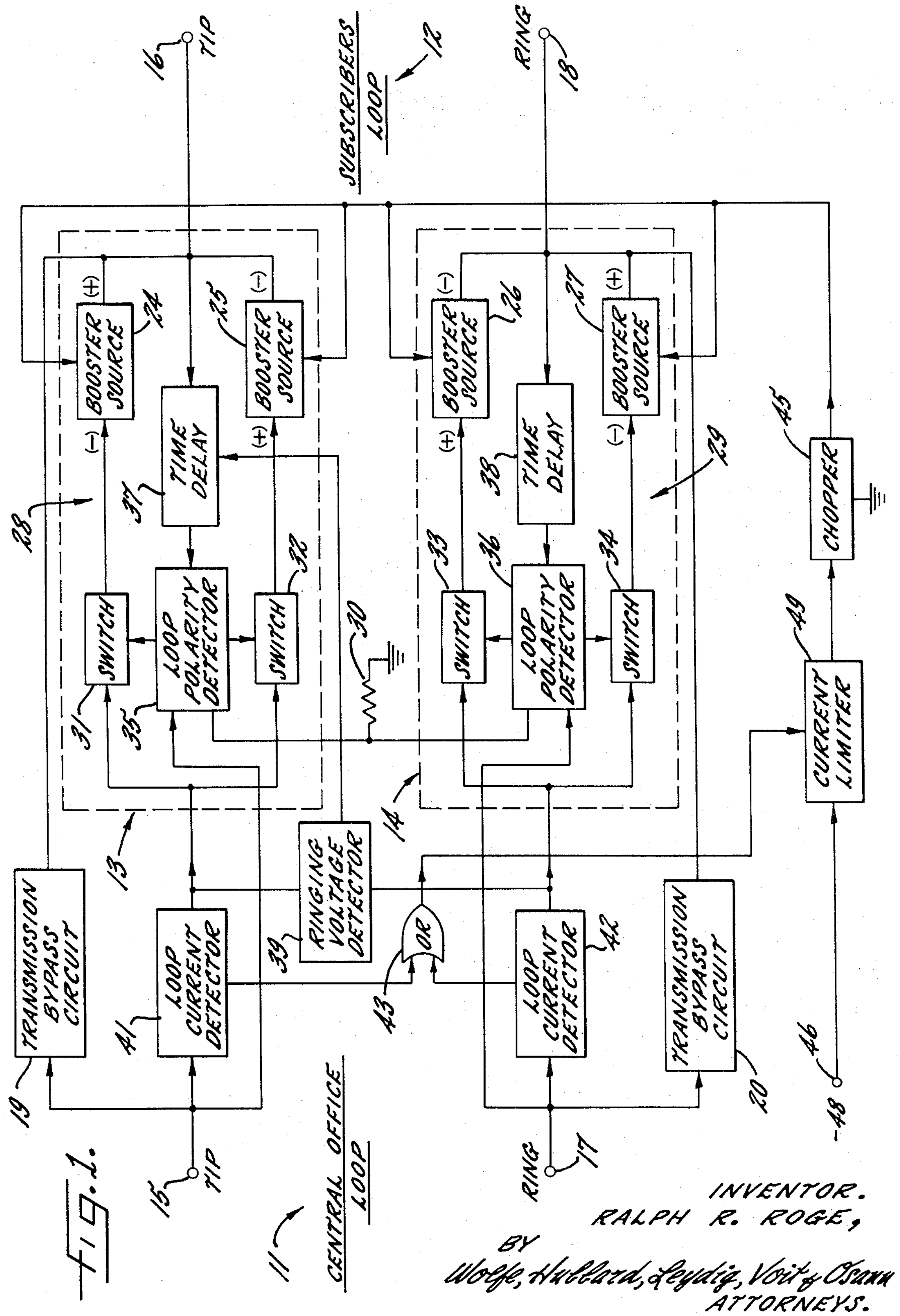
FIG. 1 is a block diagram of a loop extender constructed in accordance with the present invention.

Turning now to the drawings, and particularly to FIG. 1, loop extenders are generally employed on a per loop basis. That is, a separate loop extender is normally provided for each subscriber's loop for which extended signaling and supervisory range is required. It will, therefore, be understood that the single loop extender here shown as being connected between a central office loop 11 and a subscriber's loop 12 is only illustrative of one of the many similar installations that may be included within a given central office. The subscriber's loop 12 may, of course, be either a party line or a private line.

As previously noted, the purpose of a loop extender is to increase or boost the d.c. voltage levels of the control signals from the relatively low levels at which they are supplied by the central office battery and associated signal generating equipment (not shown) to the higher levels required for effective transmission to the subscriber. The loop extender should not, however, degrade the quality of the voice and data communication signals transmitted by or to the subscriber. Thus, the illustrated loop extender includes tip and ring side booster circuits 13 and 14 which are respectively connected in series between the tip leads 15 and 16 and the ring leads 17 and 18 of the central office and subscriber's loops 11 and 12. Further, there is a respective transmission bypass circuit 19 and 20 connected in parallel with each of the booster circuits 13 and 14 to provide a shunt path for voice and data communication signals.

As is known, the central office battery is normally polarized so that the central office tip lead 15 is positive relative to the ring lead 17. There are occasions, however, in which the polarization of the central office battery is changed for signaling and supervisory purposes; sometimes to reverse the polarities of the tip and ring leads 15 and 17 and other times to cause both leads to be of the same polarity relative to ground. Of course, the loop extender must follow such changes, but some difficulties have been experienced with known loop extenders in ensuring that they do not also follow the a.c. swings of any ringing voltage that may be impressed across the central office tip and ring leads 15 and 17. In accordance with one feature of the present invention, such problems are overcome by including in each of the booster circuits 13 and 14 a pair of parallel connected, oppositely polarized, floating voltage supplies 24, 25 and 26, 27, and by using polarity sensitive switching circuits 28 and 29 with predetermined time constants for selectively switching such voltage supplies into and out of series with the central office battery. In this way a series aiding relationship is maintained between the central office battery and the tip side voltage supply 24 or 25 and the ring side voltage supply 26 or 27, and the a.c. swings of any ringing voltage that may be present are rejected.

More particularly, for carrying out the foregoing feature of the invention, in the illustrated embodiment, the tip side and ring side switching circuits 28 and 29 each include switches 31, 32 and 33, 34 which are connected in series with respective ones of the tip and ring side booster voltage supplies 24, 25 and 26, 27. The tip side switches 31 and 32 and the ring side switches 33 and 34 are selectively operated in dependence on the polarity of the tip and ring leads 15, 17 relative to one another and to ground by respective loop polarity detectors 35 and 36. To that end, the tip side and ring side loop polarity detectors 35 and 36 have their control circuits coupled in series between the central office tip and ring leads 15 and 17 and returned to ground through a resistor 30. Thus, if the tip and ring leads are oppositely polarized, current flows from the positive lead, say the tip lead 15, through the control circuits of the detectors 35 and 36 to the negative lead, e.g., the ring lead 17. In response to such a current flow, the tip side detector 35 closes the switch 31 and opens the switch 32 to insert the positively polarized booster voltage supply 24 in series between the central office and the subscriber's tip leads 15 and 16. At the same time, the ring side detector 36 closes the switch 33 and opens the switch 34 to insert the negatively polarized booster voltage supply 26 in series betwen the central office and the subscriber's ring leads 17 and 18. If, on the other hand, the central office tip and ring leads 15 and 17 are of the same polarity, the grounded resistor 30 provides an alternative path for current flow through the control circuits of the detectors 35 and 36. In either event, however, the detectors 35 and 36 operate their associated switches 31, 32 and 33, 34 in dependence on the direction of the current flow through their control circuits.

To reject the a.c. swings of any ringing voltage that may be present, the control circuits of the loop polarity detectors 35 and 36 are coupled to the subscriber's tip and ring leads 16 and 18 through respective time constant circuits 37 and 38. The time constant circuits 37 and 38 slow the response of the polarity detectors 35 and 36 sufficiently to preclude them from following the a.c. swings of any ringing voltage that may be present. Provision is made, however, to enable the tip side loop detector 35 to follow short time constant polarity changes of the central office battery in the absence of a ringing voltage. To that end, as here shown, the time constant circuit 37 for the tip side loop polarity detector 35 is normally overridden or inhibited, and a ringing voltage detector 39 is connected across the central office tip and ring leads 15 and 17 to supply an enabling signal for it in response to a ringing voltage. Similar provision is not required nor made for the ring side time constant circuit 38, since none of the signaling and supervisory techniques in present use involve the application to the ring lead 17 of a d.c. signal with a time constant anywhere near as short as the time constant of the a.c. component of the typical ringing voltage.

In accordance with another feature of the present invention, the booster voltage supplies 24–27 are secondary supplies, and means are provided for opening and closing the energizing circuits for them in response to the absence and presence, respectively, of a control signal in one or both of the central office tip and ring leads 15 and 17. In keeping with this aspect of the invention, for determining whether or not a control signal is present, respective loop current detectors 41 and 42 are connected in series with the tip and ring leads 15 and 17. The loop current detectors 41 and 42 are, in turn, coupled to respective inputs of an OR gate 43 which has its output coupled to control a d.c. chopper circuit, or d.c. to a.c. inverter, 45 which is provided for coupling power to each of the booster voltage supplies 24–27 from a suitable primary supply connected to an input terminal 46. Hence, in the absence of a control signal (i.e., under idle circuit conditions), the OR gate 43 is disabled and the chopper circuit 45, therefore, constitutes a substantially open circuit, so that little, if any, power is drained from the primary power supply. However, in the presence of a control signal, the OR gate 43 is enabled to actuate the d.c. chopper circuit 45. Accordingly, power is then coupled from the primary supply by the d.c. chopper circuit 45 to energize the booster voltage supplies 24–27.

In keeping with still another feature of the present invention, provision is also made to limit the maximum amount of current drawn by the booster voltage supplies 24–27 to a level at which there is little risk of the loop extender or any associated central office equipment being damaged, even if its output (i.e., the subscriber's tip and ring leads 16 and 18) is inadvertently shorted or connected to a low impedance subscriber—s loop. As shown, this result is conveniently obtained by inserting a current limiting circuit 49 between the primary supply and the chopper circuit 45. In this embodiment the OR gate 43 indirectly controls the chopper circuit 45 through the current limiting circuit 49. That is, the OR gate 43 has its output coupled to a control input of the current limiting circuit 49 so that drive current for the chopper circuit 45 is supplied only when the OR gate 43 is enabled.

Figure 2:
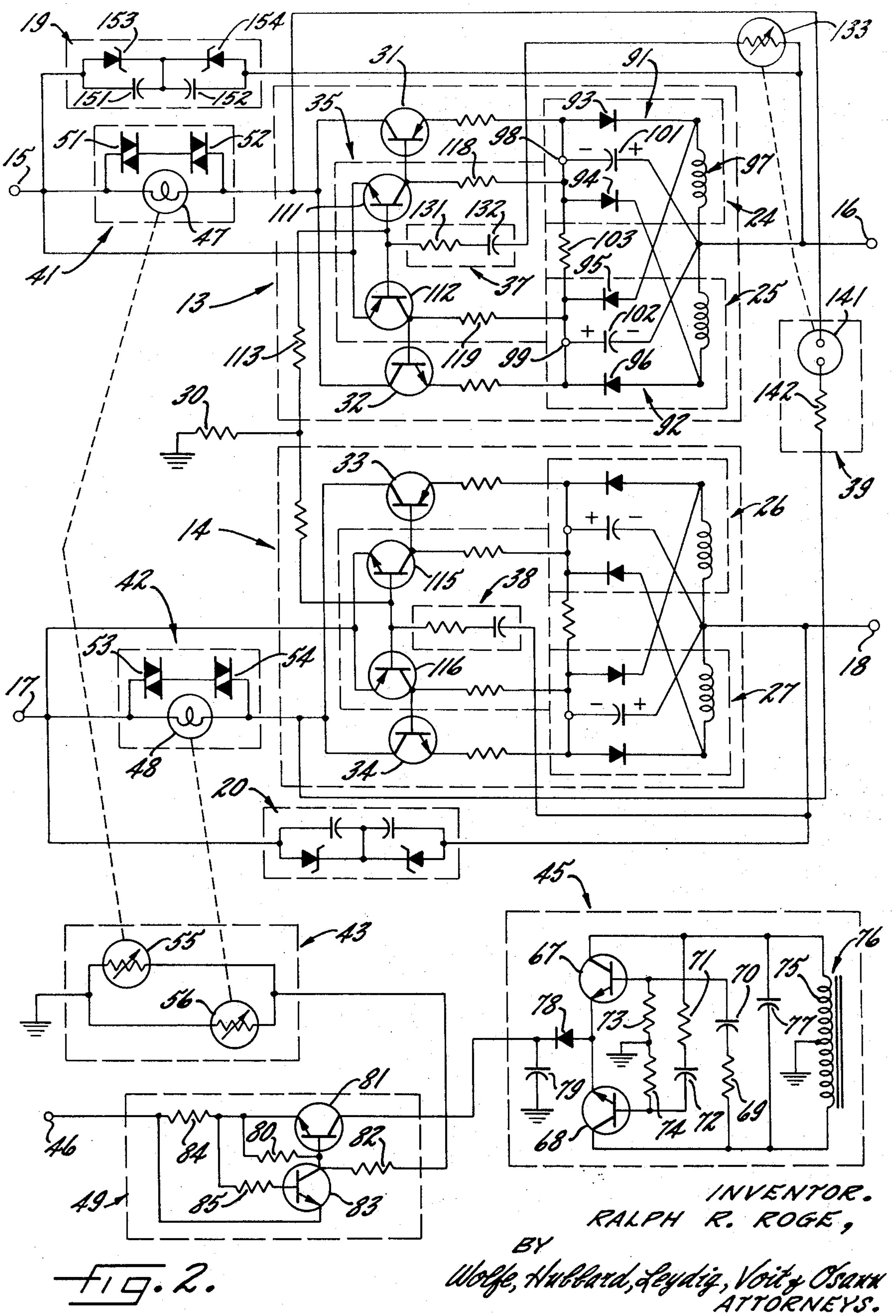
FIG. 2 is a simplified electrical schematic of a loop extender corresponding to the block diagram of FIG. 1.

With the foregoing in mind, attention is now directed to FIG. 2 for a more detailed discussion of an exemplary circuit for putting the various advantageous features of the loop extender into practice. Corresponding reference numerals have been used in FIGS. 1 and 2 to illustrate the correlation of the block diagram and schematic showings.

As illustrated in FIG. 2, the loop current detectors 41 and 42 comprise respective lamps 47 and 48 which are connected in series in the central office tip and ring leads 15 and 17. High voltage protection for the lamps 47 and 48 is provided by connecting respective sets of back-to-back varistors 51, 52 and 53, 54 in parallel therewith. The lamps 47 and 48 are selected to require a minimum d.c. energizing current of approximately 6 ma. Thus, under quiescent or idle circuit conditions of the central office loop 11, the lamps 47 and 48 are de-energized or dark. However, if a control signal is impressed on either or both of the central office tip and ring leads 15 and 16, sufficient current is drawn through the lead or leads in question to cause the lamp or lamps, as the case may be, to light.

To compliment the particular type of loop current detectors used, the OR gate 43 is formed by a pair of parallel connected photosensitive resistors 55 and 56, each of which is positioned to be illuminated by a respective one of the lamps 47 and 48. As shown, the photosensitive resistors 55 and 56 are connected between a point of ground or reference potential and the current limiting circuit 49 and are selected to have resistance characteristics such that an actuating or enabling current for the current limiting circuit 49 flows only if one or both of them is illuminated, i.e., only if the OR gate 43 is enabled.

The chopper circuit 45 includes a pair of transistors 67 and 68 which have their base and collector terminals cross-coupled through respective resistor-capacitor circuits 69, 70 and 71, 72, so that they are triggered into oscillation when the current limiting circuit 49 is enabled to complete a current path between the emitters of the transistors 67 and 68 and the input terminal 46. The base terminals of the transistors 67 and 68 are returned to ground through respective resistors 73 and 74 and the split primary winding 75 of a transformer 76 is coupled between the collectors of the transistors 67 and 68 to complete what will be recognized as being a generally conventional free running multivibrator configuration. Hence, when the OR gate 43 is enabled, a pulsating voltage with a frequency determined primarily by the time constants of the resistor-capacitor circuits 69, 70 and 71, 72 is produced across the transformer primary winding 76. A filter capacitor 77 may, of course, be connected across the primary winding 76 to eliminate undesirable harmonies of the pulsating voltages. Further a blocking diode 78 may be connected in series with the emitters of the transistors 67 and 68 to protect them against potentially damaging reverse voltages, and an a.c. bypass capacitor 79 may be connected across the base-emitter circuits of the transistors 67 and 68 to minimize the effect on the chopper circuit 45 of any noise signals that may be present.

To provide effective current limiting for the loop extender, the supply current for the chopper circuit 45 is drawn through the collector-emitter circuit of a current limited transistor 81. The transistor 81 is, in turn, switched into and out of conduction under the control of the OR gate 43. Specifically, as here shown, the base of the transistor 81 is coupled to the parallel connected photosensitive resistors 55 and 56 by a resistor 82. Small leakage currents are diverted around the base-emitter junction of the transistor 81 through a resistor 80. Consequently, there is base-emitter drive current to cause conduction of the transistor 81 only when one or both of the photosensitive resistors 55 and 56 is illuminated (i.e., only when the OR gate 43 is enabled). The current limiting action is achieved by diverting an increasing portion of the drive current for the transistor 81 through the collector-emitter circuit of a transistor 83 in response to the chopper circuit 45 drawing increasing amounts of supply current. To that end, the transistor 83 has its collector-emitter circuit connected across the base-emitter circuit of the transistor 81. Further, the base-emitter circuit of the transistor 83 is coupled across a resistor 84 through a resistor 85. The resistor 84 is coupled between the emitter of the transistor 81 and the input terminal 46. Accordingly, the current drawn by the chopper circuit 45 divides between the resistors 84 and 85 in dependence on the ratio of their respective values. Hence, as the current drawn by the chopper circuit 45 increases, the conductivity of the collector-emitter circuit of the transistor 83 increases until a balanced, or current limited, condition is reached at which any tendency for the chopper circuit 45 to draw additional current is counteracted by a drop in the conductivity of the transistor 81 due to a corresponding increase in the conductivity of the transistor 83. Typically, the ratio of the resistors 84 and 85 is set to establish a maximum current level for the chopper circuit 45 of approximately 70 ma. d.c., which is sufficient in most applications to provide adequate power for both the tip and ring side booster circuits 13 and 14 and yet low enough to be well within the capacity of the loop extender.

The tip and ring side booster circuits 13 and 14 and transmission bypass circuits 19 and 20 are substantially identical. Thus, it suffices to describe the tip side circuits, since it will be understood that the same description generally applies to the ring side circuits. Of course, special note will be made of the differences.

Thus, turning to the tip side booster circuit 13, it will be seen that the booster voltage supplies 24 and 25 comprises oppositely polarized full wave rectifiers 91 and 92. More particularly, each of the rectifiers 91 and 92 includes a pair of diodes 93, 94 and 95, 96 which extend from opposite ends of a split secondary winding 97 of the transformer 76. The diode pairs 93, 94 and 95, 96 each have a common terminal 98, 99 which is returned through a filter capacitor 101, 102 to the midpoint of the secondary winding 97. As here shown, the diodes 93 and 94 are poled so that the capacitor 101 charges to a floating positive potential, whereas the diodes 95 and 96 are poled so that the capacitor 102 charges to a floating negative potential. A resistor 103 is connected between the common terminals 98 and 99 of the rectifiers 91 and 92 to provide a measure of isolation between the rectifiers 91 and 92 when the loop extender is in its active state and to promote the discharge of the capacitors 101 and 102 when the loop extender reverts to its inactive state.

The tip side switches 31 and 32 here shown are transistors which have their collector-emitter circuits coupled between the central office tip lead 15 and the positively and negatively polarized full wave rectifiers 91 and 92, respectively. Transistor switches are preferable to other types that might be used, since their operation does not tend to create switching transients which might be received by the subscriber as an audible click.

The illustrated tip side loop polarity detector 35 is formed by a pair of complimentary transistors 111 and 112 which respectively operate the transistor switches 31 and 32 to selectively switch the rectifiers 91 and 92 into and out of circuit with the central office battery in dependence on the polarity of the central office tip lead 15 relative to the central office ring lead 16, or if the two leads are at the same polarity, relative to ground.

To accomplish their polarity sensing function, the transistors 111 and 112 have their emitters tied together and coupled to the tip side lead 15. Further, their bases are tied together and coupled through a current limiting resistor 113 to the ground return resistor 30 and the similarly configured base circuits of the complimentary transistors 115 and 116 of the ring side loop polarity detector 36. Thus, it will be seen that the transistors 111 and 112 are selectively switched into and out of conduction in response to the direction in which the base-emitter or control current flows. For instance, taking the converse of the example considered in connection with the discussion of the block diagram (i.e., assuming that the tip lead 15 is negative relative to the ring lead 17), it will be seen that current flows from the ring lead 17, through the base-emitter circuit of the transistor 116 and the resistor 113, to switch the transistor 111 into conduction. On the other hand, assuming that the tip and ring leads 15 and 17 are both positively polarized relative to the ground reference, current flows from the tip lead 15, through the base-emitter circuit of the transistor 112 and the resistors 113 and 30, to switch the transistor 112 into conduction.

To operate the transistor switches 31 and 32, the transistors 11 and 112 of the tip side loop polarity detector 35 have their collectors coupled through respective load resistors 118 and 119 to the common terminals 98 and 99. Further, the transistors 111 and 112 have their collectors respectively coupled to the bases of the transistor switches 31 and 32. Thus it will be seen that the transistor 31 is switched into conduction in response to conduction of the transistor 111, whereas the transistor 32 is switched into conduction in response to conduction of the transistor 112. Due to their complimentary configurations, the conductive states of the transistors 111 and 112 are mutually exclusive and, therefore, selective actuation of the transistor switches 31 and 32 is assured.

As previously mentioned, special provision is made in the tip side time constant circuit 37 to inhibit it in the absence of a ringing voltage. As here shown, such provision takes the form of a series connected photosensitive resistor 133. For the time being, in the interest of providing a description that applies equally as well to the tip and ring side time constant circuits 35 and 36, the effect of the photosensitive resistor 133 will be neglected (i.e., it will be assumed that it is illuminated and that the resistance presented thereby is negligible). Under those conditions it will be seen that a feedback signal which tends to oppose any change in the states of conduction of the transistors 111 and 112 is supplied through a resistor 131 and capacitor 132 that are connected between the subscriber's tip lead 16 and the bases of the transistors 111 and 112. The delay such feedback signal imposes on the response of the transistors 111 and 112 to a change in the d.c. polarization of the central office tip and ring leads 15 and 17 depends on the RC time constant of the feedback circuit. Thus, the time constant is selected to be such, when the lamp is lit, as to prevent the transistors 111 and 112 from following the a.c. voltage swings of any ringing voltage that may be present.

Returning now to the photosensitive resistor 133, it will be understood that when it is not illuminated, it inhibits the tip side time constant circuit 37 by limiting the feedback current to such a low level that it is not effective to oppose any change in the states of conduction of the transistors 111 and 112. Thus, under those conditions, the tip side polarity detector 35 can follow any short time constant changes in the d.c. polarization of the tip lead 15 relative to the ring lead 17 or ground.

To compliment the photosensitive resistor 133, the ringing voltage detector 39 here shown includes a neon bulb 141 which is positioned to illuminate the photosensitive resistor 133 and connected across the central office tip and ring leads 15 and 17 through a current limiting resistor 142. To discriminate between a ringing voltage of any of the other control signals that might be present, the neon bulb 141 is selected to have a firing potential on the order of about 70 volts. As will be appreciated, such a voltage is well above the voltage of any of the control signals other than the ringing voltage.

Finally, the tip side transmission bypass circuit 19 here illustrated comprises a pair of capacitors 151 and 152 which are connected between the central office and subscriber's tip leads 15 and 17. The capacitors 151 and 152 are shunted by respective voltage limiting Zener diodes 153 and 154. The capacitors 151 and 152 ensure faithful transmission of both the positive and negative components of any speech or data communication signals, while the Zener diodes 153 and 154 protect the capacitors 151 and 152 from being damaged, such as by having the full a.c. swing of the ringing voltage applied thereacross.

CONCLUSION

In view of the foregoing, it will now be appreciated that the present invention provides a loop extender which is fully compatible with the signaling and supervisory techniques used in telephony and which may, therefore, be employed to increase the effective range of a central office installation. Further, it will be understood that the loop extender drains only a minimum amount of power and can be used without fear of increasing the idle circuit noise level. Moreover, it will be seen that the loop extender can be installed with little risk that it or any associated equipment will be damaged should its output inadvertently be short circuited or connected to a low impedance subscriber's loop. Finally, it will be appreciated that the loop extender here disclosed is relatively simple and can be readily installed without special measures being taken to match it to the particular subscriber's loop with which it is to be used.

I claim:

1. A loop extender for use in a telephone system for increasing the signaling and supervisory range of a central office having a reversible office battery and a source of a.c. ringing voltage comprising, in combination, a tip side booster circuit inserted in the tip line and including a pair of oppositely polarized auxiliary voltage sources, a ring side booster circuit inserted in the ring line and including a pair of oppositely polarized auxiliary voltage sources, each of said booster circuits having an input terminal coupled to the office battery and an output terminal connected to the subscriber's loop circuit, polarity sensitive means for detecting the polarity of the voltage at the input terminals and for concurrently and independently switching the appropriate one of each pair of the auxiliary sources into the respective tip and ring lines of the subscriber's loop circuit so as to be in additive polarity to the office battery, and means responsive to the presence of a ringing voltage on the loop circuit for effectively disabling said polarity sensitive means to prevent said polarity sensitive means from following the a.c. reversals of the ringing voltage.

2. The combination as claimed in claim 1 wherein time delay means are coupled in circuit with the polarity sensitive means, said time delay means presenting, in the absence of ringing voltage, a time constant such that the polarity of the auxiliary sources changes promptly in step with rapid supervisory changes in the polarity of the office battery, and wherein said means responsive to the presence of ringing voltage serves to increase the time constant so that the polarity sensitive means is prevented from following the a.c. reversals of the ringing voltage.

3. The combination as claimed in claim 1 in which a current limiter is provided for limiting the current flow in the sources of auxiliary voltage.

4. The combination as claimed in claim 1 in which each source of auxiliary voltage has an a.c. input and a d.c. output, and in which a d.c. to a.c. inverter is provided supplying the a.c. inputs.

5. The combination as claimed in claim 4 in which means are provided for actuating the inverter only when current flows in the loop circuit.

6. A loop extender for use in a telephone system for increasing the signaling and supervisory range of a central office having a reversible office battery and source of a.c. ringing voltage comprising, in combination, a tip side booster circuit inserted in the tip line and including a pair of oppositely polarized sources of d.c. auxiliary voltage, a ring side booster circuit inserted in the ring line and including a pair of oppositely polarized sources of d.c. auxiliary voltage, each of said booster circuits having an input terminal coupled to the office battery and an output terminal connected to the subscriber's loop circuit, each of the auxiliary sources being of the type using a transformer and rectifier intended for energization with a.c. voltage, a d.c. to a.c. inverter having its input connected to the office battery and having its output connected to the transformers, polarity sensitive means for detecting the polarity of the voltage at the input terminals and for switching the auxiliary sources into the respective tip and ring lines of the subscriber's loop circuit so as to be in additive polarity to the office battery, and means responsive to flow of current in the loop for concurrently enabling the inverter so that the auxiliary sources of voltage are effective only when the subscriber's loop circuit is in use.

7. The combination as claimed in claim 6 in which means are provided for limiting the current furnished by the inverter thereby to limit the loop current when the loop extender is employed in a short loop.

8. A loop extender for use in a telephone system for increasing the signaling and supervisory range of a central office having a reversible office battery and source of a.c. ringing voltage comprising, in combination, a tip side booster circuit inserted in the tip line and including a source of d.c. auxiliary voltage, a ring side booster circuit inserted in the ring line and including a source of d.c. auxiliary voltage, each of said booster circuits having an input terminal coupled to the office battery and an output terminal connected to the subscriber's loop circuit, polarity sensitive means including a photosensitive series resistor for detecting the polarity of the voltage at the input terminals and for concurrently switching respective ones of said auxiliary sources into the subscriber's circuit in additive polarity to the office battery, time delay means coupled in circuit with the polarity sensitive means for presenting, in the absence of ringing voltage, a time constant such that the polarity of the auxiliary sources changes promptly in step with rapid supervisory changes in the polarity of the office battery, and means concurrently responsive to the application of ringing voltage for increasing said time constant so as to effectively disable said polarity sensitive means to prevent said polarity sensitive means from following the a.c. reversals of ringing voltage, said ringing voltage responsive means being in the form of a gaseous discharge lamp connected in circuit between the tip and ring lines and having a high ionization level so as to illuminate the photosensitive resistor to change the resistance thereof only in the presence of ringing voltage.

9. The combination as claimed in claim 8 in which the polarity sensitive means includes a feedback circuit and in which the photosensitive series resistor is in series with the feedback circuit so that when the lamp is lit the feedback circuit is fully effective to increase the time constant of the polarity sensitive means to the point where it is unresponsive to a.c. reversals of the ringing voltage.

10. A loop extender for use in a telephone system for increasing the signaling and supervisory range of a central office having a reversible office battery and source of a.c. ringing voltage which is substantially higher than the office battery voltage, said loop extender comprising, in combination, a tip side booster circuit inserted in the tip line and including a source of d.c. auxiliary voltage, a ring side booster circuit inserted in the ring line and including a source of d.c. auxiliary voltage, each of said booster circuits having an input terminal coupled to the office battery and an output terminal connected to the subscriber's loop circuit, polarity sensitive means for detecting the polarity of the voltage at the input terminals and for concurrently switching respective ones of said auxiliary sources into the subscriber's circuit in additive polarity to the office battery, and means concurrently responsive to the application of ringing voltage for effectively disabling said polarity sensitive means to prevent said polarity sensitive means from following the a.c. reversals of the ringing voltage, said ringing voltage responsive means being set to respond only to voltage on the order of the ringing voltage while being unresponsive to voltage on the order of battery voltage.

* * * * *